United States Patent [19]

Burrows

[11] Patent Number: 5,037,547
[45] Date of Patent: Aug. 6, 1991

[54] DUAL STAGE FILTER CARTRIDGE FOR A REVERSE OSMOSIS PURIFICATION SYSTEM

[76] Inventor: Bruce D. Burrows, 25581 Via Paladar, Valencia, Calif. 91355

[21] Appl. No.: 420,929

[22] Filed: Oct. 13, 1989

[51] Int. Cl.⁵ ............................ C02F 1/44; B01D 61/08
[52] U.S. Cl. .................................. 210/232; 210/257.2; 210/266; 210/282; 210/314; 210/317
[58] Field of Search ............... 210/257.2, 266, 282, 210/314, 317, 502.1, 232

[56] References Cited

U.S. PATENT DOCUMENTS

| | | | |
|---|---|---|---|
| 3,504,796 | 4/1970 | Bray | 210/137 |
| 3,542,199 | 11/1970 | Bray | 210/116 |
| 4,595,500 | 6/1986 | Galbiati | 210/266 |
| 4,609,463 | 9/1986 | Macevicz et al. | 210/238 |
| 4,642,192 | 2/1987 | Heskett | 210/638 |
| 4,650,586 | 3/1987 | Ellis | 210/636 |
| 4,678,565 | 7/1987 | Norton | 210/110 |
| 4,711,723 | 12/1987 | Bray | 210/652 |
| 4,713,175 | 12/1987 | Bray | 210/259 |
| 4,714,546 | 12/1987 | Solomon et al. | 210/137 |
| 4,743,366 | 5/1988 | Burrows | 210/110 |
| 4,776,952 | 10/1988 | Burrows | 210/110 |
| 4,834,873 | 5/1989 | Burrows | 210/136 |
| 4,913,808 | 4/1990 | Haque | 210/93 |
| 4,936,985 | 6/1990 | Hahn | 210/256 |

Primary Examiner—Stanley Silverman
Assistant Examiner—Robert James Popovics
Attorney, Agent, or Firm—Kelly Bauersfeld & Lowry

[57] ABSTRACT

A dual stage filter cartridge is provided for use in a reverse osmosis water purification system or the like. The filter cartridge includes a first stage having a filter medium for removing selected contaminants from incoming feed water, and a second stage including a reverse osmosis membrane for converting a portion of the filtered feed water to a relatively purified water supply. The filter media in the first state is particularly selected to remove contaminants which are otherwise potentially harmful to the reverse osmosis membrane. The dual stage cartridge is configured as a single unit adapted for simple drop-in installation into an open-ended cartridge housing.

5 Claims, 2 Drawing Sheets

DUAL STAGE FILTER CARTRIDGE FOR A REVERSE OSMOSIS PURIFICATION SYSTEM

BACKGROUND OF THE INVENTION

This invention relates generally to improvements in water purification systems and equipment of the reverse osmosis type. More particularly, this invention relates to an improved filter cartridge for a reverse osmosis purification unit, wherein multiple filter stages are integrated into a compact and unitary cartridge form adapted for simplified installation and replacement on an as needed periodic basis.

Reverse osmosis water purification systems are, in general terms, relatively well known in the art for producing a relatively purified water supply used for drinking, cooking, etc. Such purification systems commonly include a reverse osmosis unit having a reverse osmosis membrane which, in the presence of appropriate flow and pressure conditions, separates an incoming tap or feed water supply into the purified water supply and a relatively impure or reject water supply. In particular, the membrane functions to remove particulate matter and a wide range of dissolved solids and other contaminants from a portion of the feed water to produce the purified water supply, and to concentrate those contaminants within the remainder of the feed water thereby producing the reject supply, sometimes referred to as brine, for disposal via a suitable drain. The purified water supply is normally collected for storage at a convenient location within a suitable reservoir, and for ready dispensing through a faucet valve or the like when desired. In this regard, available reverse osmosis systems may be designed to utilize compressed air to deliver purified water from the reservoir as described, for example, in U.S. Pat. No. 4,834,873. Alternately, the system may be designed to use the pressure of the feed water to deliver purified water from the reservoir as described, for example, in U.S. Pat. No. 4,776,952.

Reverse osmosis membranes have been constructed from different materials which are known to provide different performance efficiency and rate of production of purified water. However, in many reverse osmosis systems, the choice of membrane material is dictated not by performance efficiency but instead by the chemical or bacteriological makeup of the feed water in a local water supply. For example, so-called thin film or thin film composite membranes are generally preferred in view of relatively high operational efficiencies which can be obtained from highly compact membrane cartridges having a large membrane surface area, substantially without degradation in the presence of certain bacterial organisms present in some feed water supplies. However, such thin film membranes are known to degrade rapidly in the presence of certain chemicals, particularly oxidants such as chlorine and/or compounds thereof which are often added to a local water supply to retard growth of bacteria and other organisms. Accordingly, when chlorine is present in the feed water supply, alternative and less efficient membrane materials such as cellulose acetate have normally been used to provide an acceptable membrane operating life, but with an acknowledged reduction in pure water production rate and a relatively high susceptibility to bacterial attack. Alternatively, in some systems, carbon prefilters or the like have been used upstream of a thin film membrane to remove chlorine from the feed water supply prior to reverse osmosis processing. While this latter approach can prevent premature failure of the thin film membrane, it has also required additional filter housing and filter element structures to increase the overall size and cost of a reverse osmosis system.

The present invention overcomes the problems and disadvantages associated with the prior art by providing an improved filter cartridge for a reverse osmosis system, wherein the filter cartridge includes a compact membrane of the thin film type in combination with a prefilter stage which protects the membrane against contact with otherwise harmful constituents within the local water supply.

SUMMARY OF THE INVENTION

In accordance with the invention an improved filter cartridge is provided for use in a reverse osmosis purification system, wherein the filter cartridge incorporates dual filter stages into a single easily replaceable unit. The cartridge includes a first filter stage having a filter medium for removing contaminants from an incoming feed or tap water supply, and a second filter stage including a reverse osmosis membrane. The filter medium of the first stage is designed to remove contaminants which would otherwise be potentially harmful to the reverse osmosis membrane, such that a so-called thin film or thin film composite membrane can be used without concern for the specific contaminants present in a local water supply.

In the preferred form, the dual stage filter cartridge is adapted for relatively quick and easy drop-in or slide-in installation into a matingly shaped housing for a reverse osmosis unit. As is known in the art, the reverse osmosis unit is installed within a water purification system to receive an incoming flow of feed water, and to separate the feed water into a relatively purified water supply having contaminants removed therefrom and a selectively impure or reject water supply having contaminants concentrated therein.

The dual stage filter cartridge includes the first and second stages carried about a common central support tube for series flow-through passage of the incoming feed water. More particularly, the first filter stage comprises a generally cylindrical canister mounted about the support tube and defining apertured opposite ends for flow-through passage of the feed water. The filter medium is contained within the canister and comprises a material selected to attract, remove, or react with one or more target contaminants from the feed water. As one example, the filter medium may comprise activated carbon designed to remove chlorine and its compounds from a chlorinated feed water supply. Alternatively, other types of filter media can be used and/or combined, such as oxidation reduction media as described in U.S. Pat. No. 4,642,192.

The treated feed water exits the canister of the first filter stage and then passes into and through the second stage comprising a reverse osmosis membrane. This membrane is formed by wrapping thin film layers to form an elongated yet compact tubular structure which is fitted snugly about the central support tube at a downstream end of the first filter stage. The feed water flows into one axial end of the reverse osmosis membrane for appropriate separation into the purified and reject water supplies when appropriate system pressures are maintained. The reject water exits the membrane at an opposite axial end thereof, whereas the purified water passes radially inwardly through the membrane layers and further through flow ports in the support tube to the support tube interior. From the support tube, the purified water is connected in turn for flow to a suitable reservoir for storage and/or to a faucet valve or the like for dispensing.

In accordance with one aspect of the invention, the purified water and the reject water are routed to a common end of the filter cartridge for outflow from the housing of the reverse osmosis unit, for purposes of facilitating periodic cartridge removal and replacement. In this regard, in the preferred form, the purified water is routed through the central support tube which extends through the first stage canister to a pure water outlet at one end of the housing. The reject water is similarly routed through a bleed conduit extending through the support tube to a reject water outlet disposed at the same end of the housing. Appropriate seal means such as O-ring seals are provided to isolate the purified reject water flow from each other, and further to permit simple slide-fit installation of the filter cartridge into the reverse osmosis housing with the support tube and bleed conduit connected to the pure and reject water outlets, respectively.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
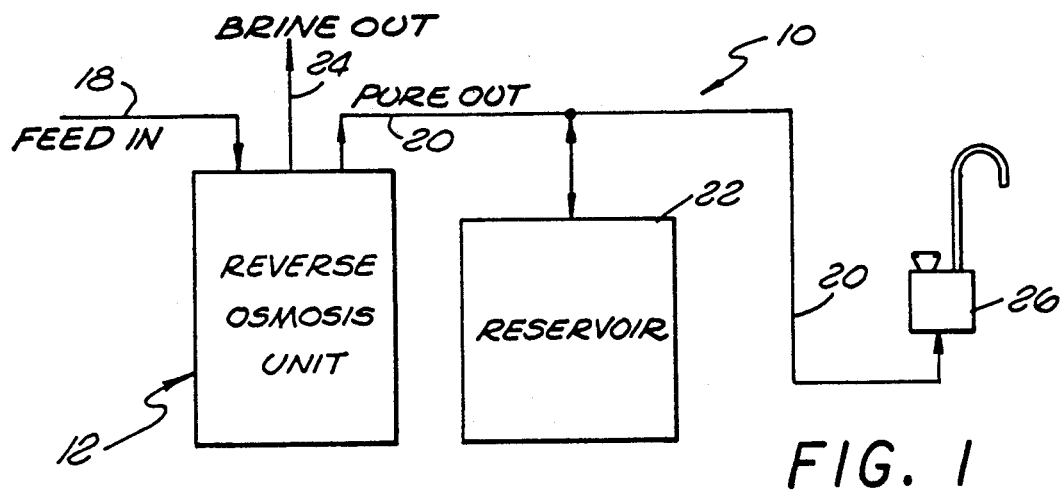
FIG. 1 is a schematic diagram representing an exemplary water purification system of the reverse osmosis type.
Figure 2:
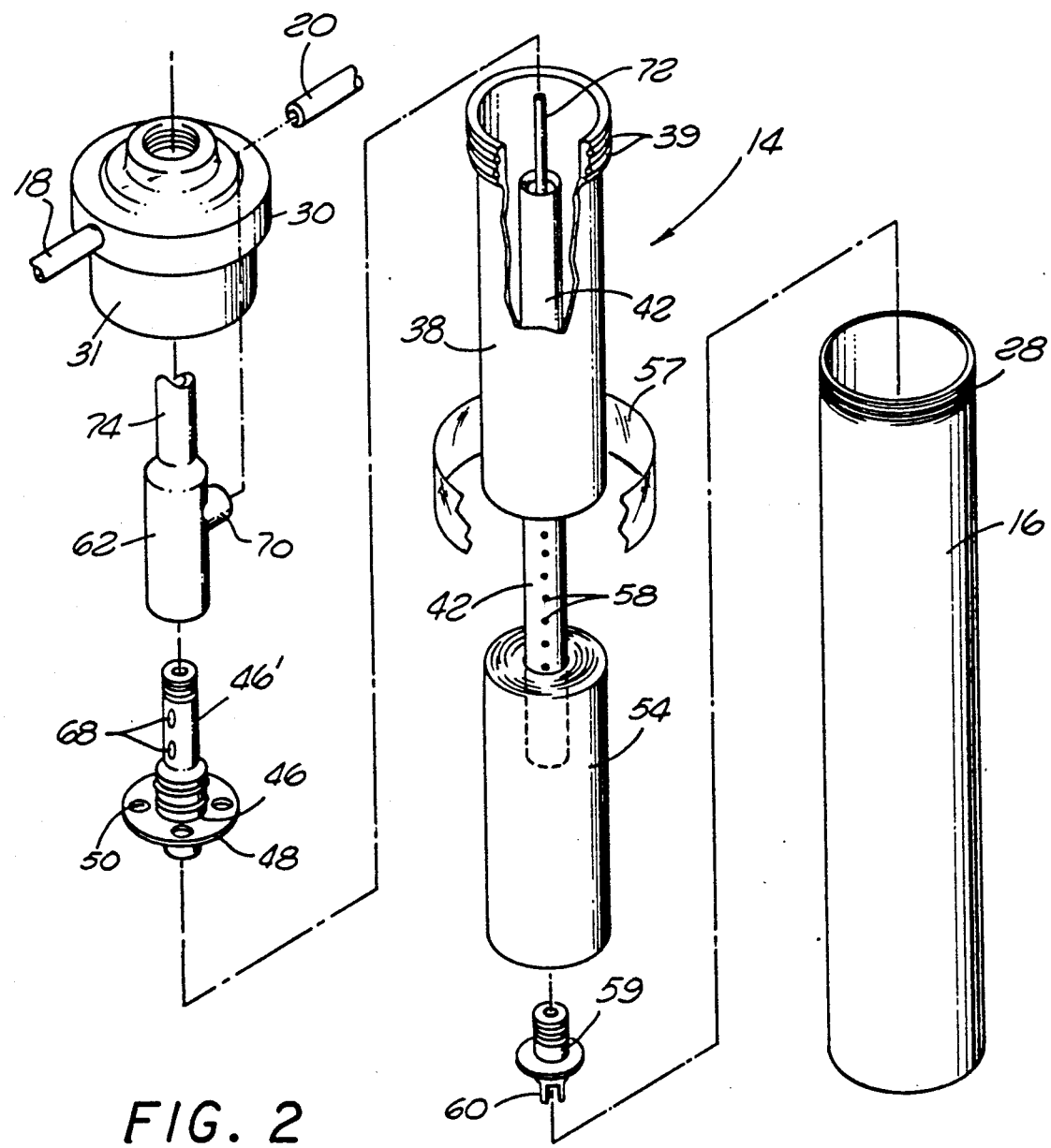
FIG. 2 is an exploded prospective view depicting components of a reverse osmosis unit for use in the system of FIG. 1, wherein the unit includes an improved dual stage filter cartridge embodying the novel features of the invention.
Figure 3:
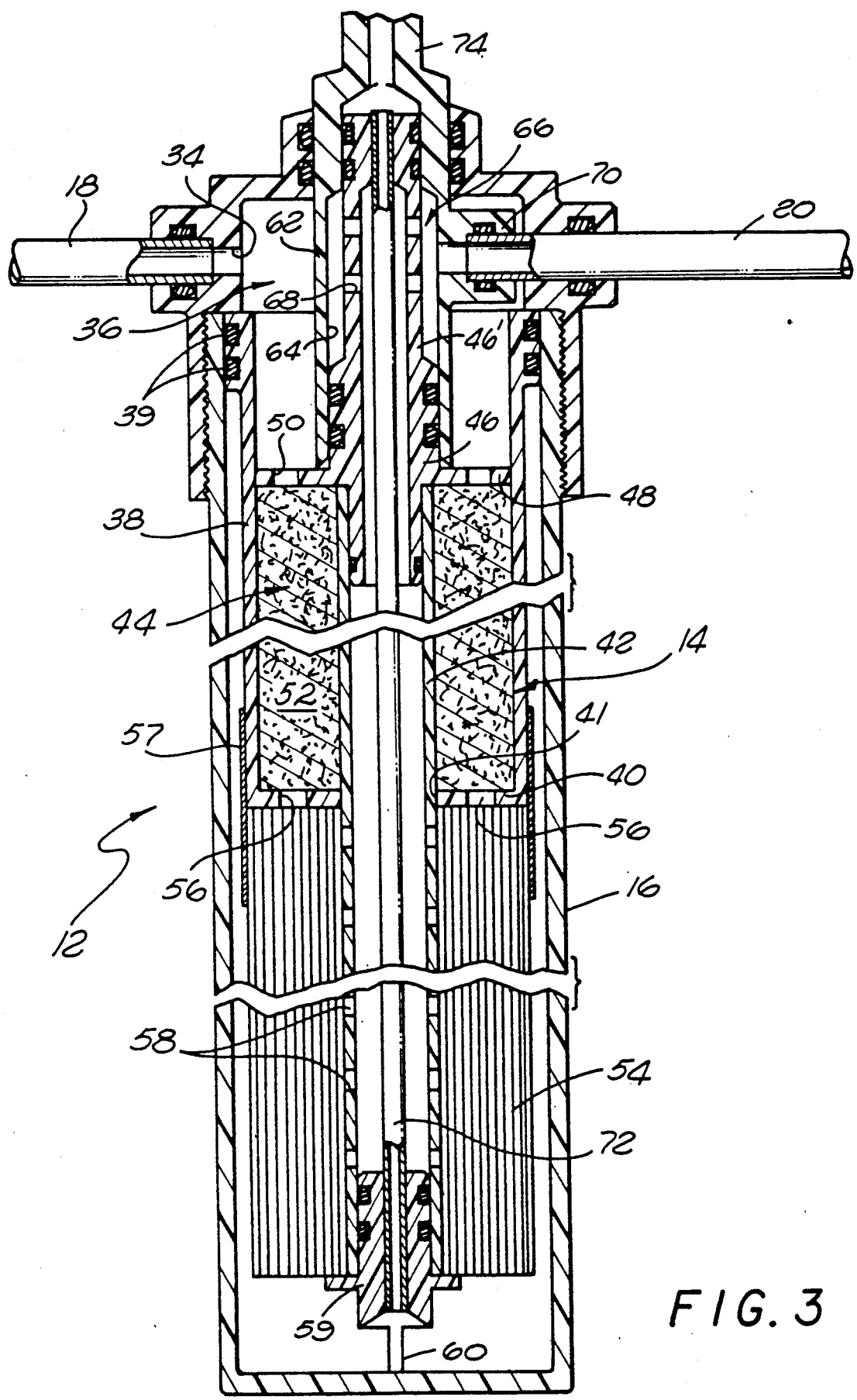
FIG. 3 is a fragmented vertical sectional view illustrating the reverse osmosis unit in assembled form.

As shown in the exemplary drawings, a water purification system referred to generally in FIG. 1 by the reference numeral 10 includes a reverse osmosis unit 12 equipped with an improved dual stage filter cartridge 14 (FIGS. 2 and 3). This dual stage filter cartridge 14 includes a reverse osmosis membrane of compact and economical design, in combination with a prefilter for isolating and protecting the membrane from contact with selected contaminants which may be present in an incoming tap or feed water supply.

The dual stage filter cartridge 14 of the present invention beneficially uses a compact and economical yet highly efficient reverse osmosis membrane of the so-called thin film or thin film composite type, such as those marketed by Filmtek Corp. of Minneapolis, Minn., and by Fluid Systems, Inc., a division of U.O.P., Inc., San Diego, Calif. This thin film membrane is used in combination with the prefilter which guards against premature degradation of the membrane upon contact with certain contaminants present in many water supplies, for example, such as chlorine and/or compounds thereof which may be added to prevent bacteria growth. This combination filter structure is advantageously integrated into a single unit adapted for rapid and easy installation and/or removal for replacement by simple slide-fit mounting within a housing 16 for the reverse osmosis unit.

The reverse osmosis water purification system 10 (FIG. 1) is generally conventional in the art to include the reverse osmosis unit 12 connected to receive an incoming feed water supply 18. In general terms, the reverse osmosis unit 12 functions in the presence of appropriate fluid pressures to produce a supply of relatively purified water for use in drinking, cooking, etc. This purified water supply is produced by removal of particulate and certain dissolved contaminants, wherein these removed constituents are concentrated within a reject or brine water supply. The purified water supply is normally coupled through an appropriate pure water conduit 20 for flow to and storage within a reservoir 22. Conversely, the reject or brine water supply is normally discharged via a drain conduit 24 or the like for flow to a suitable waste or drain site. The purified water supply within the reservoir is available for dispensing and use upon opening a faucet valve 26 or the like. In this regard, the reservoir 22 may include pneumatic or hydraulic pressure means for delivering the purified water to the faucet valve 26 when the faucet vale is opened, all in a matter known in the art and described, by way of example, in U.S. Pat. Nos. 4,834,873 and 4,776,952 which are incorporated by reference herein.

As shown in FIGS. 2 and 3, the reverse osmosis unit 12 comprises an upwardly open and generally cylindrical housing 16 adapted to receive the dual stage filter cartridge 14 embodying the novel features of the invention. The housing 16 includes mounting means such as externally formed threads 28 near the open upper end thereof for rapid and convenient removable connection into an upper cap 30 which is suitably connected to the various conduits of the purification system, as will be described in more detail. As shown in the drawings, this cap 30 includes a downwardly projecting cylindrical flange 31 having internal threads to permit reception of and connection to the housing 16. However, it will be understood that alternative removable connection structures for the housing 16 and the cap 30 may be used.

The dual stage filter cartridge 14 is designed for simple slide-fit, drop-in mounting into the housing 16 of the reverse osmosis unit 12. When the housing 16 is then fastened onto the cap 30, incoming feed water from the feed water conduit 18 is confined for flow in series through the dual filter stages, as will be described, to produce the supply of purified water.

More particularly, the upper cap 30 of the reverse osmosis unit 12 includes an inlet port 34 to which the feed water conduit 18 is suitably connected (FIGS. 2 and 3). The feed water flows during system operation through the inlet port 34 into an annular inlet chamber 36 defined cooperatively by the cap 30 and an upper end of the filter cartridge 14. A generally cylindrical filter canister 38 is formed at an upper end of the cartridge to provide a first filter stage and opens upwardly to receive feed water within the inlet chamber 36. One or more seal members such as O-rings 39 or the like are compressively seated between the interior of the housing 16 and the upper external end of the canister 38 to prevent feed water leakage about the canister exterior.

The filter canister 38 has a generally cup-shaped geometry to include a lower end wall 40. A central aperture 41 is formed in this end wall 40 to permit relatively tight slide-fit reception of a central support tube 42 which comprises a main support structure tying the dual filter stages together as a single unit. An adhesive may be used, if desired, to mount the canister securely onto the support tube. The support tube 42 includes an imperforate upper end region extending generally coaxially within the canister 38 and cooperating therewith to define a cylindrical filter cavity 44 of general annular cross section. An upper adaptor fitting 46 includes a lower plug seated within the upper end of the support tube 42 and also includes an outwardly radiating annular flange 48 extending into snug contact with an interior wall surface of the canister 38.

The flange 48 of the fitting 46 includes multiple flow ports 50 to permit downward feed water flow from the inlet chamber 36 to the filter cavity 44. A selected filter medium 52 is encased within the filter cavity 44, wherein the filter medium is selected for attracting, removing, or reacting with one or more target contaminants from the feed water, in addition to filtering of particulate in accordance with the structural characteristics of the filter medium. In one preferred form of the invention, activated carbon is used as the filter medium to remove chlorine and compounds thereof from the feed water. Alternately, other filter media and/or combinations thereof can be used, such as oxidation reduction media as described in U.S. Pat. No. 4,642,192.

The second filter stage of the dual stage cartridge 14 is defined by a reverse osmosis membrane 54 mounted on the central support tube 42 at a position immediately below the canister 38. In this regard, the lower end wall 40 of the canister 38 includes a plurality of flow ports 56 for downward passage of the treated feed water to the reverse osmosis membrane 54. A sealing sleeve 57 is conveniently mounted about the juncture of the canister 38 and the membrane 54 to confine feed water flow endwise into the membrane. In this regard, as is known in the art, the reverse osmosis membrane 54 comprises a large plurality of membrane layers wrapped in an open-ended cylindrical configuration about the support tube 42, with the illustrative membrane 54 being conveniently constructed from a so-called this film or thin film composite material which can be wrapped compactly yet provide a large overall surface area for contact with the feed water. When appropriate fluid pressures are maintained during system operation, the supply of relatively purified water is produced by migration in the radial direction ultimately for inward passage through a series of ports 58 in the lower end region of the support tube 42. The reject or brine water collects contaminants deposited between the membrane layers for exit flow from the lower end of the membrane 54.

In accordance with one primary aspect of the invention, the filter medium 52 within the canister 38 is selected for protection of the reverse osmosis membrane 54. More particularly, it is known that certain membrane materials such as thin film materials are subject to rapid deterioration and premature failure upon contact with specific chemical substances which may be present in the feed water supply. As one example, chlorine is often used as an additive in water systems to retard bacterial growth, but this chemical will cause rapid degradation of a thin film type membrane. The filter medium 52 within the canister 38 may thus be selected to remove chlorine from the feed water, and thereby permit a thin film membrane to be used. In this regard, such thin film membranes are often desired in view of their relatively high efficiency in the production of purified water at a relatively rapid rate.

In accordance with further aspects of the invention, the purified and reject water supplies are both routed to the top of the reverse osmosis unit 12 for discharge through the upper cap 30. With this construction, the housing 16 can be formed as a simple upwardly open cylinder adapted for drop-in, slide-fit of the cartridge 14. The cartridge 14 can thus be installed and/or replaced as needed quickly and easily without concern for complex plumbing connections, etc.

More specifically, with continued reference to FIGS. 2 and 3, a lower end adaptor fitting 59 is seated within the lower end of the central support tube 42 to prevent intermixture between the reject and purified water supplies. One or more spacer legs 60 may be included on the fitting 58 to insure adequate spacing between the membrane 54 and the lower end of the housing 16. Produced purified water within the support tube 42 is permitted to pass upwardly through the support tube 42 and further through the adaptor fitting 46 at the upper end of the canister 38. This upper adapter fitting 46 includes a tubular upper extension 46, which projects into an outlet fitting 62 mounted within the cap 30. An inner bore 64 of the outlet fitting 62 provides an annular outlet chamber 66 surrounding a segment of the extension 46', with appropriate discharge ports 68 permitting pure water flow to this outlet chamber 66 which is coupled in turn to the purified water conduit 20 extending through the cap 30 for connection to a pure water outlet port 70 on the fitting 62.

The reject water supply at the lower end of the reverse osmosis membrane 54 is free to flow through a bleed conduit 72. A lower end of this bleed conduit 72 is carried by the adaptor fitting 59 at the lower end of the support tube 42, which mounts the bleed conduit to extend concentrically within the support tube 42 to an upper end connection with the adaptor extension 46,. The reject water supply flows further through a reject outlet port 74 on the outlet fitting 62 which is appropriately connected to the drain conduit 24.

The dual stage filter cartridge thus provides a unitary structure adapted for rapid and simple drop-in mounting within the reverse osmosis housing 16. The cartridge provides combination filtering reverse osmosis action which can be coordinated to permit use of special membrane materials in an otherwise hostile environment.

A variety of modifications and improvements to the dual stage filter cartridge of the present invention will be apparent to those skilled in the art. Accordingly, no limitation on the invention is intended by way of the foregoing description and accompanying drawings, except as set forth in the appended claims.

What is claimed is:

1. A reverse osmosis unit for a purification system, comprising:
   a unit housing formed as a generally open-ended cylinder and a housing cap defining a feed water inflow port, a purified water outlet port, and a reject water outlet port, said cylinder and cap including means for removable interconnection to define a generally hollow interior; and
   a dual stage filter cartridge for drop-in mounting into the interior of said housing, said cartridge including a first filter stage having a selected filter media, a second filter stage including a reverse osmosis membrane for separating water into a relatively purified water supply and a relatively impure reject water supply, means for connecting said feed water inflow port to said cartridge for series passage flow of water from said inflow port through said first and second filter stages, means for coupling the purified water supply to said purified water outlet port, and means for coupling said reject water supply to said reject water outlet port, said first and second filter stages being interconnected to provide a unitary cartridge.

2. The reverse osmosis unit of claim 1 wherein said connecting means includes means carried by said cartridge for sealing engagement with the interior of said cylinder.

3. The reverse osmosis unit of claim 1 wherein said first and second filter stages are mounted on a common central support tube, and further wherein said cartridge coupling means for said purified and reject water supplies includes means for routing the purified and reject water supplies separately through said central support tube to said cap.

4. The reverse osmosis unit of claim 1 wherein said filter media of said first stage comprises a material selected for moving contaminants harmful to said reverse osmosis membrane of said second stage.

5. The reverse osmosis unit of claim 1 wherein said reverse osmosis membrane of said second stage comprises a thin film membrane.

* * * * *